（12） United States Patent
Lange-Pearson et al.

(10) Patent No.: US 7,155,629 B2
(45) Date of Patent: Dec. 26, 2006

(54) VIRTUAL REAL TIME CLOCK MAINTENANCE IN A LOGICALLY PARTITIONED COMPUTER SYSTEM

(75) Inventors: Adam C. Lange-Pearson, Rochester, MN (US); Thomas J. Warne, Eyota, MN (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/411,455

(22) Filed: Apr. 10, 2003

(65) Prior Publication Data

US 2004/0205368 A1 Oct. 14, 2004

(51) Int. Cl.
*G06F 1/14* (2006.01)

(52) U.S. Cl. ....................... 713/500; 713/502

(58) Field of Classification Search ................ 713/100, 713/500, 502; 702/176, 178
See application file for complete search history.

(56) References Cited

U.S. PATENT DOCUMENTS

| | | | | |
|---|---|---|---|---|
| 4,303,850 A | * | 12/1981 | Juhasz et al. ................. | 377/32 |
| 6,138,243 A | * | 10/2000 | Mealey et al. .............. | 713/400 |
| 6,167,482 A | * | 12/2000 | Schmidt et al. ............. | 711/103 |
| 6,968,473 B1 | * | 11/2005 | Kriz et al. .................. | 713/500 |

FOREIGN PATENT DOCUMENTS

| | | |
|---|---|---|
| JP | 63-201731 | 8/1988 |
| JP | 06-332568 | 12/1994 |
| JP | 10-097343 | 4/1998 |
| JP | 2000-020158 | 1/2000 |

* cited by examiner

*Primary Examiner*—Lynne H. Browne
*Assistant Examiner*—Paul Yanchus, III
(74) *Attorney, Agent, or Firm*—Patterson & Sheridan, LLP (57) ABSTRACT

Methods, apparatus, systems, and articles of manufacture for maintaining virtual real time clocks (virtual RTCs) in a logically partitioned computer system are described. Changes made to a hardware real time clock (hardware RTC) while a partition manager is not running (or is not fully operational) are tracked. The cumulative effect of these changes on the hRTC value may be captured in a clock delta variable. For some embodiments, a service processor may be configured to track the changes to the hRTC while the partition manager is not running and generate the clock delta. Upon loading, the partition manager may utilize this captured clock delta to make adjustments to vRTCs, in an effort to preserve their integrity by compensating for the changes made to the hRTC while the partition manager was not running.

17 Claims, 4 Drawing Sheets

VIRTUAL REAL TIME CLOCK MAINTENANCE IN A LOGICALLY PARTITIONED COMPUTER SYSTEM

BACKGROUND OF THE INVENTION

1. Field of the Invention

The present invention generally relates to logically partitioned computer systems and more particularly to maintaining virtualized real time clocks based on a hardware real time clock.

2. Description of the Related Art

In a computing environment, parallel processing generally refers to performing multiple computing tasks in parallel. Traditionally, parallel processing required multiple computer systems, with the resources of each computer system dedicated to a specific task, or allocated to perform a portion of a common task. However, recent advances in computer hardware and software technologies have resulted in single computer systems capable of highly complex parallel processing, by logically partitioning the system resources to different tasks. In a logically partitioned computer system, available system resources are allocated among multiple logical partitions, each designed to appear to operate independently of the other. Management of the allocation of resources among logical partitions is typically accomplished via a layer of software components, commonly referred to as a partition manager.

An objective of the partition manager is to allow each logical partition to independently run software (e.g., operating systems and operating system-specific applications), typically developed to run on a dedicated computer system, with little or no modification. For example, one logical partition may be running a first operating system, such as IBM's OS/400, a second logical partition may be running a second operating system, such as IBM's AIX, while a third logical partition may be running a third operating system, such as Linux. By providing the ability to run multiple operating systems on the same computer system, a logically partitioned system may provide a user with a greater degree of freedom in choosing application programs best suited to the user's needs with little or no regard to the operating system for which an application program was written.

The partition manager typically accomplishes the objective of allowing each of the logical partitions to independently run software by presenting each logical partition with a set of virtual resources (software components) that operate, from the perspective of the logical partition, in an identical manner to corresponding hardware components. In other words, the partition manager may allow each logical partition to, in affect, operate as an independent virtual computer system (or virtual machine) with its own set of virtual resources.

One example of a virtual resource that may be provided to each logical partition is a virtual real time clock, which may be derived from a single actual hardware real time clock that is battery backed to allow for system time keeping in the absence of power. The partition manager typically keeps track of the virtualized real time clocks by maintaining offsets, for each logical partition, from the hardware real time clock. While the logical partitions are able to modify the virtual real time clocks, they are typically prohibited from modifying the hardware real time clock, which might render the offsets invalid.

While each virtual real time clock may be set to a different time (e.g., via a different partition offset), it is a general objective for the serviceability of a logically partitioned system to synchronize the real time clock among various components responsible for maintaining the partitions in the system, which may include the partition manager, a service processor, a remote console used for controlling the system as a whole, or any combination of such components. It is furthermore an objective for such systems to have the capability to perform this synchronization without the restriction that the partition manager be powered up and fully operational for this synchronization to occur. Therefore, it may be permissible to make changes to the hardware real time clock while the partition manager is not running.

However, if the hardware real time clock is changed while the partition manager is not running, the virtual real time clock data (e.g., offsets) for the logical partitions may no longer be valid. Accordingly, in conventional logically partitioned systems, changes to a hardware real time clock while the partition manager is not running may result in the loss of all partition virtual real time clocks, which must then be reset by the user, one by one, which may require significant time and effort. In an effort to prevent this scenario on conventional logically partitioned systems, access to setting the hardware real time clock while the partition manager is not running is severely restricted, which may undesirably limit serviceability.

Accordingly, there is a need for an improved method and apparatus for maintaining virtual real time clocks, based on a hardware real time clock, that allows changes to the hardware real time clock while logical partitioning software is not running.

SUMMARY OF THE INVENTION

The present invention generally is directed to a method, article of manufacture, and system for maintaining one or more virtual real time clocks in a logically partitioned computer system.

One embodiment provides a method for maintaining at least one virtual real time clock for at least one logical partition managed by a logical partitioning operating system. The method generally includes tracking, while the logical partitioning operating system is not running, changes made to a hardware real time clock and adjusting, based on the changes made to the hardware real time clock, one or more data elements from which the virtual real time clock is derived.

Another embodiment provides a method for maintaining one or more virtual real time clocks in a computer system having one or more logical partitions managed by a logical partitioning operating system. The method generally includes capturing, by a service processor, changes made to a hardware real time clock while the logical partitioning operating system is not running and adjusting, by the logical partitioning operating system, one or more data elements from which the virtual real time clock is derived based on the captured changes.

Another embodiment provides a computer-readable medium containing a program for maintaining a virtual real time clock. When executed by a processor, the program performs operations generally including accessing a variable indicative of a change in a hardware real time counter while a logical partitioning operating system was not running and adjusting, based on the variable, one or more data elements from which the virtual real time clock is derived.

Another embodiment provides a logically partitioned computer system including a hardware real time clock, a service processor, at least one logical partition having a corresponding virtual real time clock, and a partition manager. The service processor is generally configured to capture changes to the hardware real time clock while a partition manager is not running as a delta clock variable. The partition manager is generally configured to access the delta clock variable and adjust, based on the delta clock variable, one or more data elements from which the virtual real time clock is derived.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a method, apparatus, system, and article of manufacture for maintaining virtual real time clocks (virtual RTCs) in a logically partitioned computer system. In general, changes made to a hardware real time clock (hardware RTC) while a partition manager is not running (or is not fully operational) are tracked. The cumulative effect of these changes on the value of the hardware RTC may be captured in a variable referred to herein as "clock delta." For some embodiments, a service processor may be configured to track changes to the hardware RTC while the partition manager is not running and generate the clock delta. Upon loading, the partition manager may utilize this captured clock delta to make adjustments to the virtual RTCs, in an effort to preserve their integrity by compensating for the changes made to the hardware RTC while the partition manager was not running.

As used herein, the term real time clock generally refers to any type of timing mechanism that may be used for timing purposes relative to a specific reference point in time. As used herein the term virtual generally refers to a software component configured to appear to operate as a corresponding hardware component. Thus, a virtual real time clock generally refers to a software component configured to appear to operate as a corresponding hardware real time clock, for example, allowing an application program to read and set its value. While a common use of a real time clock is to keep and maintain date and time of day values (collectively referred to herein as TOD values), aspects of the present invention may be used to an advantage to maintain virtual real time clocks used for any other time keeping purposes. Thus, any reference in the following description to time of day functions should be regarded as a specific, but not limiting application example of a real time clock.

One embodiment of the invention is implemented as a program product for use with a computer system such as, for example, the logically partitioned computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications and the Internet.

Figure 1:
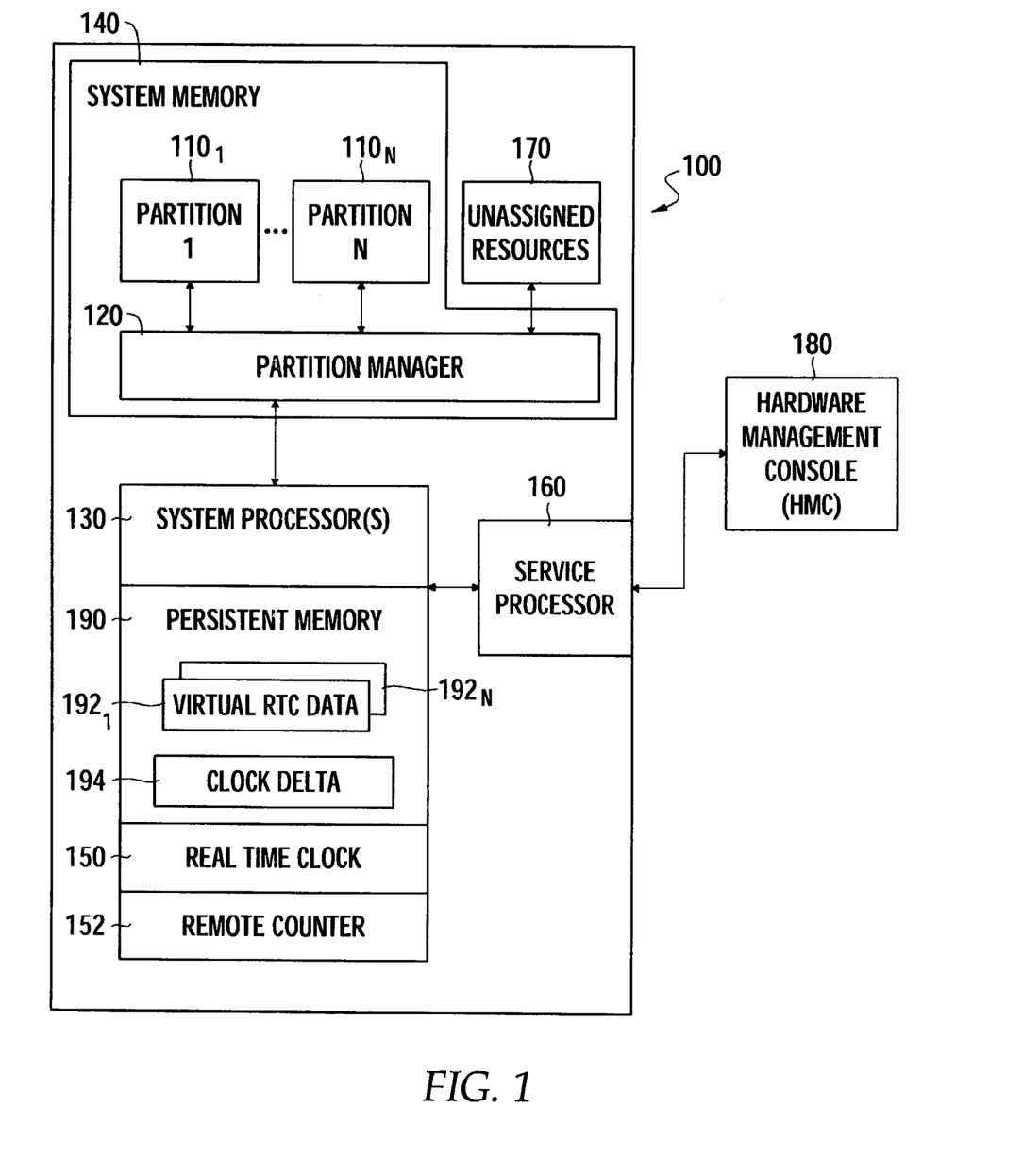
FIG. 1 is a logically partitioned computer system illustratively utilized in accordance with the invention.

In general, the routines executed to implement the embodiments of the invention, may be part of an operating system or a specific application, component, program, module, object, or sequence of instructions, including, for example, firmware embodied as a partition manager 120 and service processor 160 of the logically partitioned computer system 100 shown in FIG. 1. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified or implied by such nomenclature.

An Exemplary Logically Partitioned System

FIG. 1 illustrates a logically partitioned computer system 100 having one or more logical partitions 110 (shown as logical partitions $110_1$ through $110_N$ to represent that any number N of logical partitions 110 may be supported). A partition manager 120 may generally control the creation and deletion of the logical partitions 110. The computer system 100 may be any suitable type of computer system capable of supporting logical partitioning, such as a network server, a mainframe computer, and the like. In one embodiment, the computer system 110 is an eServer iSeries computer system available from International Business Machines (IBM) of Armonk, N.Y.

The computer system 100 generally includes one or more system processors 130, coupled with system memory 140. The system processors 130 may be allocated among the logical partitions 110 according to any suitable allocation arrangement. For example, each logical partition 110 may have its own dedicated one or more of the system processors 130 or may share one or more of the system processors 130 with one or more other logical partitions 110. The allocation of system processors 130, system memory 140, as well as various other assigned resources and unassigned resources 170, among the logical partitions 110 may be controlled by the partition manager 120.

In addition to the system processors 130, the computer system 100 may include a service processor 160, which is generally configured to run continuously and independently of the partition manager 120, including when the partition manager 120 is not running. The service processor 160 typically runs specialized firmware code to run portions of initial program loads (IPLs), which may include component testing. As such, the service processor 160 usually has controlling access to hardware including the ability to start and stop system processors 130 and read fault isolation registers in various components, shown. The service processor 160 may also be available to help diagnose system problems that may occur during run time. The service processor 160 may be implemented as a microprocessor, such as a PowerPC processor available from IBM, programmed (via internal or external memory) to perform the operations and functions described herein.

The service processor 160 may serve as an interface to the computer system 100 for a hardware management manager (HMC) 180. The HMC 180 may be implemented as a custom configured personal computer (PC) connected to the computer system 100 (typically using the service processor 160 as an interface) and used to configure logical partitioning and other low-level system management. For some embodiments, similar functionality may be provided via one or more service partitions (not shown), or other similar type interfaces, that may also interface with the service processor 160.

For some embodiments, the service processor 160 provides the only software interface to hardware components, such as a real time clock (RTC) 150. In other words, requests to set the RTC 150 from other components, such as the partition manager 120 or HMC 180, may only be carried out through the service processor 160. As previously described, the service processor 160 may continue to run after the partition manager 120 is powered down and may, therefore, allow changes to the RTC 150 via the HMC 180 or similar such hardware interface.

The RTC 150 generally represents any type of counting device (such as a battery-backed real time clock chip) configured to run continuously that may be used for persistent time-keeping purposes, such as maintaining "real" system time or "time of day" (TOD). It will be appreciated that TOD may be kept in any suitable format, the particular details of which will vary with different embodiments, and may even vary between partitions 110. As previously described, the partition manager 120 may maintain a virtual real time clock for each partition 110, which may be maintained as an offset from the RTC 150. Depending on an exact implementation, the offsets for each partition may be stored directly as, or derived from, virtual RTC data 192 stored in persistent memory 190 (e.g., battery backed or non-volatile RAM).

However, as previously described, if the RTC 150 is modified, or set, to a different time while the partition manager 120 is not running (e.g., via the HMC 180), the virtual RTC data 192 for the logical partitions 110 may no longer be valid. Therefore, for some embodiments, the service processor 160 may be configured to monitor changes to the RTC 150 while the partition manager 120 is powered down (not running), and capture the cumulative effect of such changes in persistent memory 190, as a variable clock delta 194. Upon loading, the partition manager 120 may utilize this clock delta 194 to adjust the virtual RTC data 192, or other similar variables used with the virtual RTC data 192 to calculate virtual RTC values (TOD) for the logical partitions, in an effort to compensate for changes to the RTC 150 while the partition manager 120 was not running.

Virtual Real Time Clock Maintenance

Figure 2A:
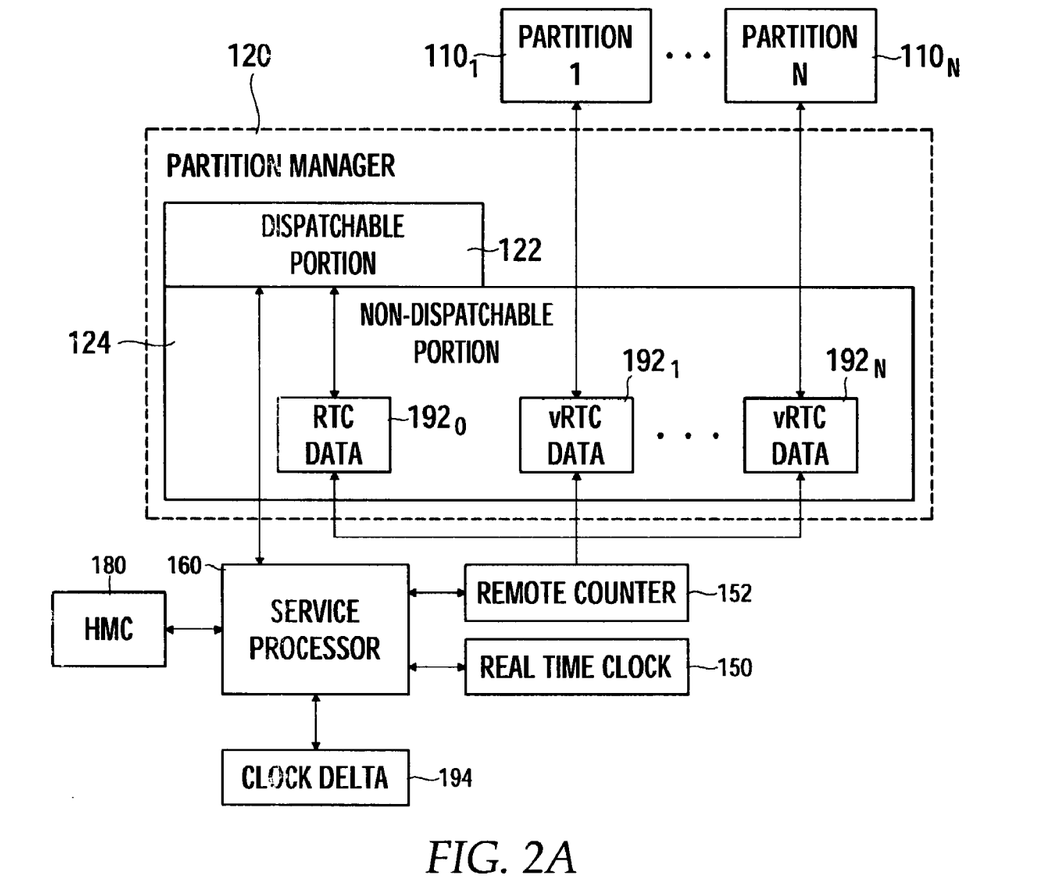
FIG. 2A is a relational view of software components of one embodiment of the invention and FIG. 2B illustrates an exemplary virtual real time clock data structure in accordance with an embodiment of the present invention.

FIG. 2A is a relational view of hardware and software components according to one embodiment of the invention. As illustrated, the partition manager 120 may be implemented as two generally separate layers of code, including a dispatchable portion 122 and a non-dispatchable portion 124. The non-dispatchable portion 124 is generally implemented as system firmware of the computer system 100, provides low-level partition management functions, such as transport control enablement (e.g., I/O access), page-table management, and contains the data and access methods needed to configure, service, and run multiple logical partitions 110. The dispatchable portion 122 generally handles higher-level partition management functions, such as virtual service processor functions, and starting/stopping partitions.

The non-dispatchable portion 124 may also handle virtual RTC function calls for the logical partitions 110, while the dispatchable portion 122, along with the service processor 160, may ensure the virtual RTCs are properly maintained after changes to the hardware RTC 150 while the partition manager 120 is not running. For example, as previously described, the service processor 160 may capture changes to the RTC 150 while the partition manager 120 is not running, while the dispatchable portion 122 of the partition manager 120 may use the captured changes to make adjustments to the virtual RTCs. As will be described in greater detail below, the actual adjustment made to the virtual RTCs may depend upon their exact implementation.

Figure 3:
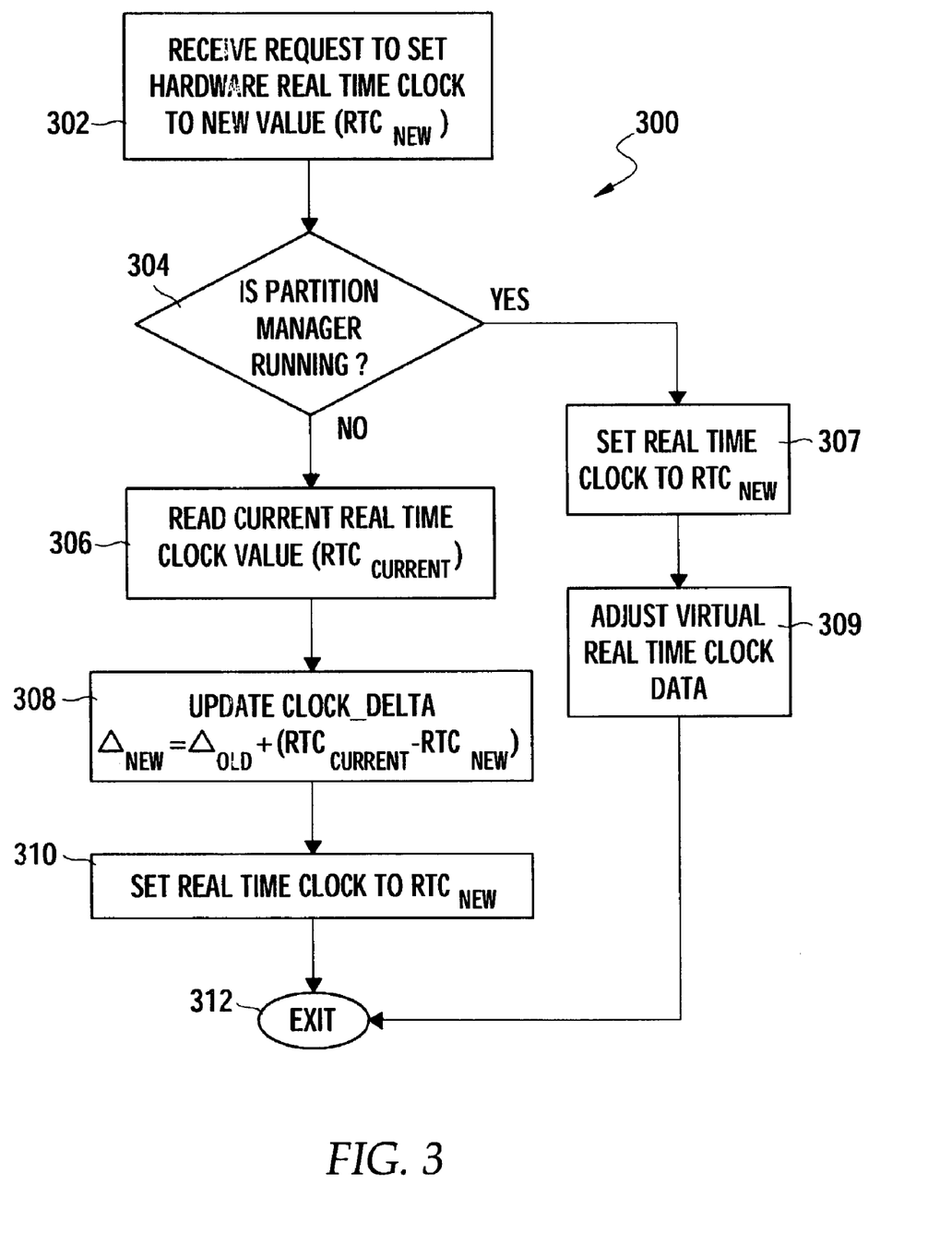
FIG. 3 is a flow chart illustrating exemplary operations that may be performed by a service processor in accordance with an embodiment of the present invention.

FIG. 3 illustrates exemplary operations 300 that may be performed, for the most part, by the service processor 160 (or any other type component capable of tracking changes to the hardware RTC 150), to track changes to the hardware RTC 150 while the partition manager 120 is not running and to generate clock delta 194. It is assumed that the value of clock delta 194 is known prior to commencing the operations 300, however, no assumption is made as to its actual value. The operations 300 may be best described with reference to FIG. 2A.

The operations 300 begin at step 302, by receiving a request to set the RTC 150 to a new value ($RTC_{NEW}$). For example, the service processor 160 may receive a request to set the RTC 150 from the HMC 180 or the partition manager 120. At step 304, a determination is made as to whether the partition manager 120 is running. This determination may be made, for example, by examining a status flag, or simply based on the identity of the component that sent the request (which may be contained in the request itself). If it is determined that the partition manager 120 is running, the partition manager 120 may synchronize any changes to the RTC 150 with the virtual real time clocks. Therefore, at step 307, the RTC 150 is set to the new value and, at step 309, virtual real time clock data (e.g., virtual RTC data 192) is updated to reflect the change in the RTC 150.

On the other hand, if the partition manager 120 is not running, changes to the RTC 150 are captured as clock delta 194 for use in adjusting to the virtual RTCs (e.g., at a later time when the partition manager 120 is loaded). At step 306, the current value of the RTC 150 is read and, at step 308, a new clock delta 194 ($\Delta_{NEW}$) is generated using the following equation:

$$\Delta_{NEW} = \Delta_{CURRENT} + (RTC_{NEW} - RTC_{CURRENT})$$

where $\Delta_{CURRENT}$ and $RTC_{CURRENT}$ are the current values of clock delta 194 and the RTC 150, respectively. Once the new clock delta 194 is calculated, the RTC 150 may be set to $RTC_{NEW}$, at step 310, prior to exiting the operations 300, at step 312. The operations 300 may be repeated, as necessary to capture cumulative changes to the RTC 150 as clock delta 194, for use by the partition manner 120 in adjusting the virtual RTCs for the logical partitions 110.

Figure 4:
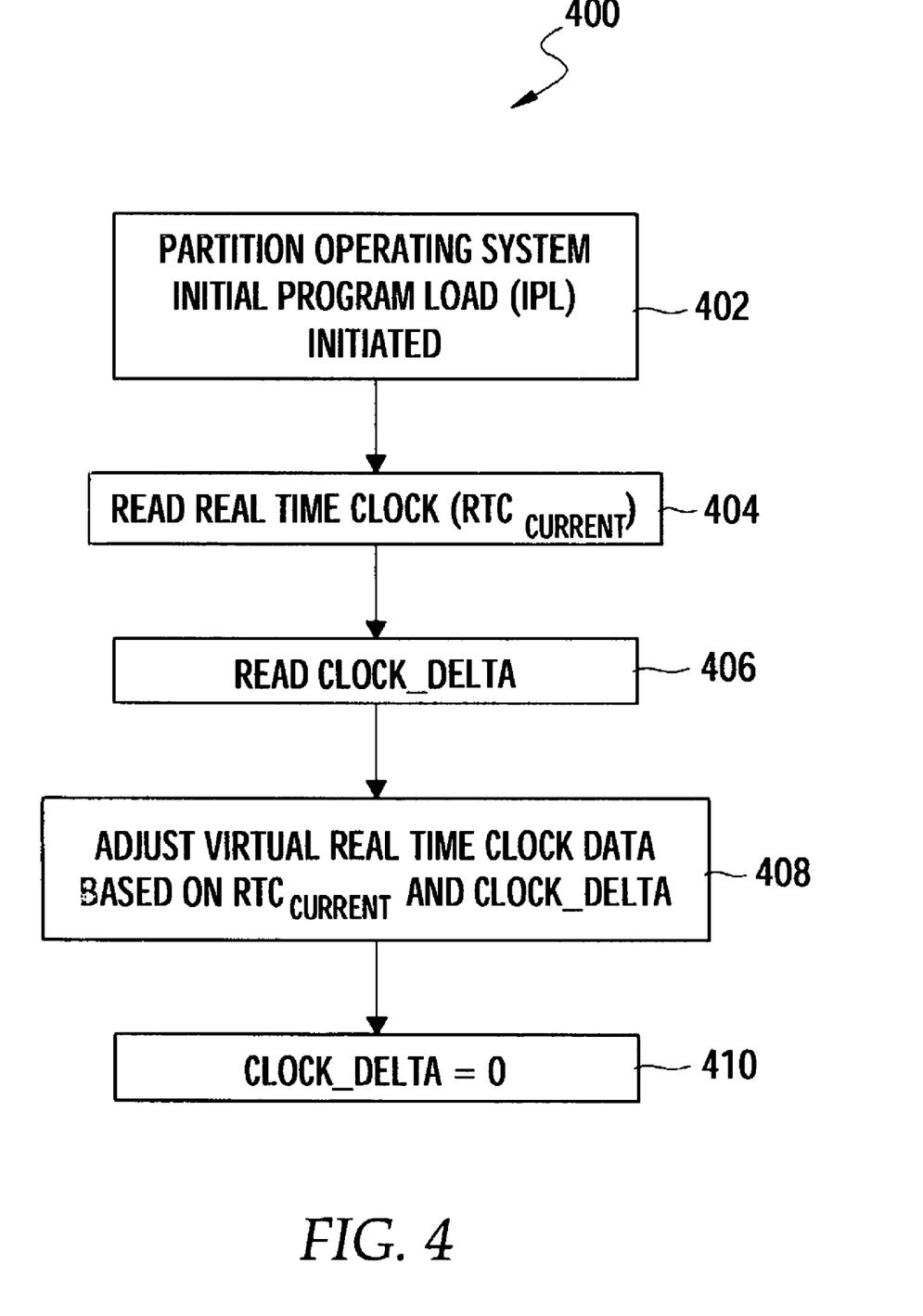
FIG. 4 is a flow chart illustrating exemplary operations that may be performed by a partition manager in accordance with an embodiment of the present invention.

FIG. 4 illustrates exemplary operations 400 that may performed, for example, by the partition manager 120 (e.g., upon loading) to adjust the virtual RTCs of partitions 110, based on the captured clock delta 194. The operations 400 begin, at step 402, as an initial program load (IPL) of partition operating system (e.g., the partition manager 120) is initiated. At step 404, a current value of the RTC 150 ($RTC_{CURRENT}$) is read and, at step 406, clock delta 194 is read, for example, from persistent memory 190. At step 408, the virtual RTCs are adjusted based on $RTC_{CURRENT}$ and clock delta 194, prior to zeroing the clock delta 194, at step 410 (to ensure the clock delta 194 is only used once to update the virtual RTCs).

An Exemplary Virtual Real Time Clock Implementation

The actual adjustments made to the virtual RTCs depends upon the particular way the virtual RTCs are implemented. As illustrated in FIG. 2A, for some embodiments, the virtual RTC data 192 may be derived from a remote counter 152 and the RTC 150. The remote counter 152 may be a free-running counter, from which a virtual RTC (or TOD) value may be derived based on an offset value stored in the RTC data 192. While the hardware RTC 150 and the remote counter 152 may operate at different frequencies, their values may be made consistent through any combination of scaling and conversion. Therefore, a TOD value may be derived by converting a binary value of the remote counter 152 to any desired TOD format, which may include separate components for units such as year, month, day, hours, minutes, seconds, and fractions of a second.

Therefore, the remote counter 152 may be used to represent a range of TOD values defined by an earliest time (e.g., corresponding to a minimum value) and a latest time (e.g., corresponding to a maximum value). As a specific example, the remote counter 152 may be a 49-bit counter that increments every 8 microseconds. Thus, the remote counter 152 may span a time period of approximately 143 years (i.e., $2^{49} \times 8 \times 10^{-6}$ seconds).

For some embodiments, the partition manager 120 may also be configured to utilize the remote counter 152 as a reference for system time, and utilize the RTC 150 to maintain the system time in the event of a power down, as described above. However, as the RTC 150 and remote counter 152 may have slightly different resolutions and accuracy, a drift may occur between the real time derived from the remote counter 152 and the real time derived from the RTC 150. Therefore, in order to minimize this drift, the dispatchable portion 122 of the partition manager 120 may be configured to periodically synchronize the RTC 156 and the remote counter 152, for example, by periodically updating the RTC 156 based on the value of the remote counter 152.

Regardless, as previously described, virtual RTCs may be maintained by keeping an offset from the remote counter 152 for each logical partition (e.g., in persistent memory 190). These offsets may be stored directly or may be derived from other data, either of which may be stored as RTC data 192.

For some embodiments, when an application running on a partition 110 sets its corresponding virtual RTC, the partition manager 120 may save two data elements (e.g., as virtual RTC data 192) for use in calculating an offset from the remote counter 152 for that partition 110:1) the value to which the virtual RTC is set, and 2) the value of the remote counter 152 at the time virtual RTC is set.

Figure 2B:
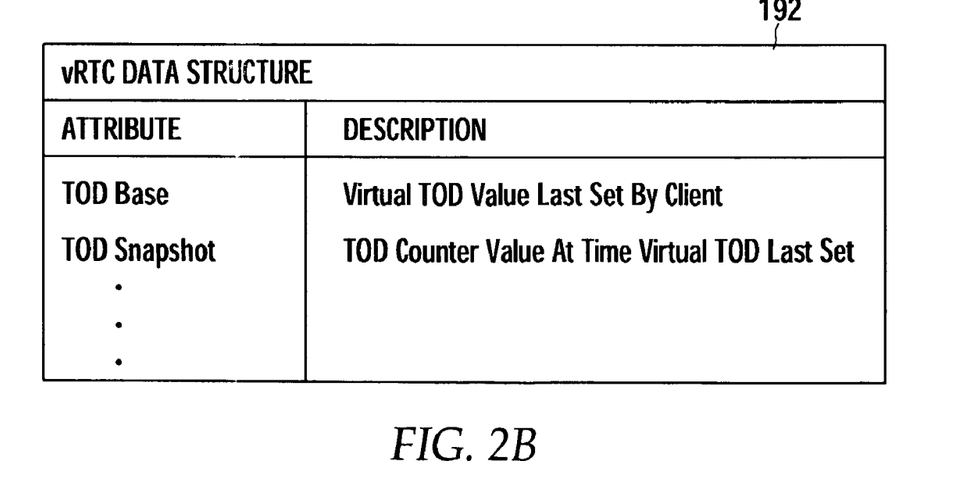

As an example, FIG. 2B illustrates an exemplary data structure that may be used to store these two data elements. As shown, a base TOD value (TODBase) that represents the last virtual RTC (TOD) value set by a client (e.g., the corresponding logical partition 110) and a snapshot of the remote counter 152 (TODSnapshot) at the time the last virtual RTC value (TODBase) was set by the client.

Thus, TODBase and TODSnapshot provide a reference point in time relating the virtual time of day to the free running counter value 152. In other words, the virtual RTC offset (vRTCOFFSET) may be determined using the following equation:

$$vRTC_{OFFSET} = TODBase - TODSnapshot$$

The virtual RTC offset may then be used to calculate a current virtual RTC value ($vRTC_{CURRENT}$) from a current value of the remote counter 152 ($TOD_{CURRENT}$) using the following equation:

$$vRTC_{CURRENT} = TOD_{CURRENT} + vRTC_{OFFSET}.$$

However, the remote counter 152 is typically not battery-backed and does not run in the absence of power. Thus, the state of the remote counter 152 at power initialization may be undefined. Therefore, in order to user the remote timer 152 as a TOD reference, it may first be initialized following a power cycle based on the RTC 150, to generate an estimated value the remote counter 152 would have reached if it had continue to run during power down.

This estimated value of the remote counter 152 ($TOD_{EST}$) may be calculated based on snapshot values of the RTC 150 ($RTC_{SNAPSHOT}$) and the remote counter 152 ($TOD_{SNAPSHOT}$) at a known time, (which may be stored as RTC Data $192_0$ accessible by the dispatchable portion 122 of the partition manager 120 during an IPL) that provide a reference point in time, and the current value of the RTC 150 ($RTC_{CURRENT}$). For example, $TOD_{EST}$ may be calculated using the following equation:

$$TOD_{EST} = TOD_{SNAPSHOT} + SCALE(RTC_{CURRENT} - RTC_{SNAPSHOT}).$$

As shown, because the remote counter 152 and RTC 150 may be operating at different frequencies, it may be necessary to first scale the RTC values. For some embodiments, it may also be necessary to convert the RTC values to a format consistent with the remote counter 152, for example, if the RTC 150 provides distinct values (e.g., year, day, hour, seconds, and the like). Regardless, the partition manager 120 may set the remote counter 152 to this estimated value ($TOD_{EST}$), for example, after an IPL, such that the remote counter 152 appears to have run continuously while powered down. Thus, virtual real time clocks based on the remote timer 152 may be properly maintained.

As previously described, however, the service processor 160 may continue to run when the partition manager 120 is powered down or is not fully operating, and may continue to allow changes to the RTC 150 which may affect the TOD estimate described above, in effect rendering the time reference provided by $RTC_{SNAPSHOT}$ invalid. However, as described above, these changes may be captured in the clock delta 194 ($\Delta_{CLOCK}$), which may be used to compensate the TOD estimate using the following equation:

$$TOD_{EST} = TOD_{SNAPSHOT} + SCALE(RTC_{CURRENT} - RTC_{SNAPSHOT} - \Delta_{CLOCK})$$

In other words, positive changes to the RTC 150 are subtracted from the current RTC value (or any negative changes are added to the current RTC value), so the value of the remote counter 152 is estimated as if it had continue to run during power down. An advantage to this approach is that virtual RTC calculations based on the remote counter 152 for all the logical partitions 110 may be compensated for changed in the hardware RTC 150 by adjusting a single value (the remote counter 152).

Of course, rather than adjust the remote counter 152, the clock delta 194 may also be used to compensate virtual RTC calculations according to various other techniques. For example, vRTC offset calculations may be compensated using the clock delta by the following equation:

$$vRTC_{OFFSET} = TOD_{Base} - TODSnapshot - SCALE(\Delta_{CLOCK})$$

As another alternative, one of the actual values stored as vRTC data 192 may be adjusted using the clock delta 194. For example, during (or after) an IPL, the partition manager 120 may adjust one of the values shown in FIG. 2B according to the following equations:

$$TODBase_{NEW} = TODBase_{OLD} - SCALE(\Delta_{CLOCK}), \text{ or}$$

$$TODSnapshot_{NEW} = TODSnapshot_{OLD} + SCALE(\Delta_{CLOCK}).$$

Adjusting either value will have the same effect on the calculated offset. Of course, similar types of adjustments may be made based on the clock delta 194 for various different types of virtual real time clock implementations.

Regardless of their particular implementation, after adjusting the virtual RTCs based on the clock delta 194, the clock delta 194 may be cleared (as shown in step 410 of FIG. 4), for example, by the partition manager 120, to ensure the virtual RTCs are only adjusted once for any captured set of changes to the RTC 150. Further, for some embodiments, a set of state variables may be maintained in persistent memory 190, that may be used to recover from errors that may occur during virtual RTC adjustments, using well known techniques.

CONCLUSION

Embodiments of the present invention allow the integrity of virtual RTCs in a logically partitioned system to be maintained across power cycles by tracking changes made to a hardware RTC while a partition manager is not running. These changes to the hardware RTC may be captured as a clock delta variable that may be used to adjust the virtual RTCs once the partition manager is running, thus achieving a desirable level of serviceability without requiring users to manually reset the virtual RTCs for each partition whenever changes are made to the hardware RTC while the partition manager is not running.

While the foregoing is directed to embodiments of the present invention, other and further embodiments of the invention may be devised without departing from the basic scope thereof, and the scope thereof is determined by the claims that follow.

What is claimed is:

1. A method for maintaining at least one virtual real time clock for at least one logical partition managed by a logical partitioning operating system, comprising:
   tracking changes made to a hardware real time clock while the logical partitioning operating system is not running; and
   adjusting one or more data elements from which the virtual real time clock is derived based on the tracked changes made to the hardware real time clock, the adjusting being done at a point in time after the tracking and while the logical partitioning operating system is running, wherein the adjusting comprises setting a free running counter, on which the virtual real time clock is based, to a value generated based on the changes to the hardware real time clock and snapshot values of the free running counter and the hardware real time clock taken at approximately the same time.

2. The method of claim 1, further comprising:
   reading a value of the hardware real time clock; and
   calculating a value for the virtual real time clock by adding the offset value to the value of the hardware real time clock.

3. The method of claim 1, wherein the adjusting comprises adjusting an offset value associated with the virtual real time clock.

4. The method of claim 3, further comprising:
   reading a value of a free running counter; and
   calculating a value for the virtual real time clock by adding the offset value to the value of the free running counter.

5. The method of claim 3, further comprising calculating the offset value from a stored value to which the virtual real time clock was last set and a corresponding stored value of a free running timer.

6. The method of claim 1, further comprising periodically synchronizing the free running counter and the hardware real time clock.

7. A method for maintaining one or more virtual real time clocks in a computer system having one or more logical partitions managed by a logical partitioning operating system, the method comprising:
   capturing, by a service processor, changes made to a hardware real time clock while the logical partitioning operating system is not running, wherein capturing the changes comprises receiving a request to change the hardware real time clock to a new value, determining if the logical partitioning operating system is running, and if not, reading a current value of the hardware real time clock, adjusting a delta variable based on the amount of change between the new value and the current value, and subsequently setting the hardware real time clock to the new value; and
   adjusting, by the logical partitioning operating system, one or more data elements from which the virtual real time clock is derived based on the captured changes, the adjusting being done at a point in time after the capturing of the changes and while the logical partitioning operating system is running.

8. The method of claim 7, wherein the adjusting comprises:
   accessing, by the logical partitioning operating system, the delta variable from the service processor; and
   adjusting, by the logical partitioning operating system, one or more data elements for each logical partition based on the delta variable.

9. The method of claim 8, wherein adjusting, by the logical partitioning system, the one or more data elements comprises adjusting an offset value for each logical partition.

10. The method of claim 8, wherein adjusting, by the logical partitioning system, the one or more data elements comprises adjusting a value of a free-running counter.

11. A computer-readable medium containing a program for maintaining at least one virtual real time clock which, when executed by a processor, performs operations comprising:

accessing a variable indicative of a change in a hardware real time counter while a logical partitioning operating system was not running; and adjusting one or more data elements from which the virtual real time clock is derived based on the variable, the adjusting being done at a point in time after the change in the hardware real time counter and while the logical partitioning operating system is running, wherein the adjusting comprises setting a free running counter, on which the virtual real time clock is based, to a value generated based on the changes to the hardware real time clock and snapshot values of the free running counter and the hardware real time clock taken at approximately the same time.

12. The computer-readable medium of claim 11, wherein the adjusting comprises adjusting an offset value associated with the virtual real time clock.

13. The computer-readable medium of claim 12, wherein the operations further comprise:

reading a value of the free running counter; and calculating a value for the virtual real time clock by adding the offset value to the value of the free running counter.

14. The computer-readable medium of claim 13, wherein the operations further comprise calculating the offset value from a stored value to which the virtual real time clock was last set and a corresponding stored value of the free running timer.

15. A logically partitioned computer system, comprising:

a hardware real time clock;

a service processor configured to capture changes to the hardware real time clock while a partition manager is not running as a delta clock variable;

at least one logical partition having a corresponding virtual real time clock;

a partition manager configured to adjust one or more data elements from which the virtual real time clock is derived based on the delta clock variable, the adjusting being done at a point in time after the change to the hardware real time clock and while the logical partitioning operating system is running; and a free running counter, wherein the one or more data elements comprises at least one of a value of the free running counter and an offset value associated with the virtual real time clock, wherein the partition manager is configured to set the free running counter to a value generated based on the delta clock variable, and snapshot values of the free running counter and the hardware real time clock taken at approximately the same time.

16. The logically partitioned computer system of claim 15, wherein the partition manager is further configured to calculate a value for the virtual real time clock based on the offset value and the free running counter.

17. The logically partitioned computer system of claim 15, wherein the service processor is configured to capture changes to the hardware real time clock by:

receiving a request to change the hardware real time clock to a new value;

determining if the logical partitioning operating system is running; and if not, reading a current value of the hardware real time clock, adjusting a delta variable based on the amount of change between the new value and the current value, and subsequently setting the hardware real time clock to the new value.

* * * * *